(12) United States Patent
Nagwanshi et al.

(10) Patent No.: US 12,420,688 B2
(45) Date of Patent: Sep. 23, 2025

(54) HYBRID SEAT STRUCTURE AND VEHICLE COMPRISING THE SAME

(71) Applicant: SABIC GLOBAL TECHNOLOGIES B.V., Bergen op Zoom (NL)

(72) Inventors: Dhanendra Kumar Nagwanshi, Novi, MI (US); Dinesh Munjurulimana, South Lyon, MI (US); Curtis Steven Collar, Moorestown, NJ (US); Ersin Koyunoglu, Geleen (NL); Steve McClintock, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/649,124

(22) Filed: Apr. 29, 2024

(65) Prior Publication Data
US 2024/0278699 A1 Aug. 22, 2024

Related U.S. Application Data

(63) Continuation of application No. 17/625,210, filed as application No. PCT/EP2020/069329 on Jul. 9, 2020, now Pat. No. 12,005,822.

(30) Foreign Application Priority Data

Jul. 11, 2019 (EP) .................................... 19185749

(51) Int. Cl.
*B60N 2/68* (2006.01)
(52) U.S. Cl.
CPC ............. *B60N 2/686* (2013.01); *B60N 2/682* (2013.01)

(58) Field of Classification Search
CPC .................................. B60N 2/68; B60N 2/686
See application file for complete search history.

(56) References Cited

U.S. PATENT DOCUMENTS

| 5,575,533 | A | 11/1996 | Glance |
| 2009/0091162 | A1 | 4/2009 | Zimmerman et al. |

(Continued)

FOREIGN PATENT DOCUMENTS

| CA | 2859006 A1 | 7/2013 |
| CN | 102717740 A | 10/2012 |

(Continued)

OTHER PUBLICATIONS

International Search Report and Written Opinion for International Application No. PCT/EP2020/069329; Application Filing Date: Jul. 9, 2020; Date of Mailing: Nov. 12, 2020; 12 pages.

*Primary Examiner* — Timothy J Brindley
(74) *Attorney, Agent, or Firm* — CANTOR COLBURN LLP

(57) ABSTRACT

A hybrid seating structure, comprising: a main structure formed from a thermoplastic material and injection molded as a single piece, comprising: a frame formed by a left channel, right channel, bottom channel, and top channel; wherein each channel is defined by an outside wall, an inside wall, and a connecting wall that extends between the outside wall and the inside wall, wherein the inside walls of each channel form an inner side of the frame, and the outside walls and connecting walls form an exterior side of the frame; and each channel comprises a first reinforcing rib structure disposed in the channel; wherein the outside wall of the left channel comprises a first reinforcement; and wherein the outside wall of the right channel comprises a second reinforcement.

20 Claims, 8 Drawing Sheets

(56) References Cited

U.S. PATENT DOCUMENTS

| | | |
|---|---|---|
| 2011/0101744 A1 | 5/2011 | Naughton et al. |
| 2012/0187738 A1 | 7/2012 | Gross et al. |
| 2013/0140860 A1 | 6/2013 | Naughton et al. |
| 2013/0320742 A1 | 12/2013 | Murolo et al. |
| 2022/0242289 A1 | 8/2022 | Nagwanshie et al. |

FOREIGN PATENT DOCUMENTS

| | | |
|---|---|---|
| CN | 103097190 A | 5/2013 |
| CN | 104816660 A | 8/2015 |
| CN | 104816661 A | 8/2015 |
| CN | 104875653 A | 9/2015 |
| DE | 102008042325 A1 | 4/2010 |
| DE | 102009050840 A1 | 6/2011 |
| DE | 102019207585 A1 | 11/2020 |
| EP | 1477360 A2 | 11/2004 |
| KR | 101738058 B1 | 5/2017 |
| KR | 20190073898 A | 6/2019 |
| WO | 2008019981 A1 | 2/2008 |
| WO | 2009154909 A1 | 12/2009 |
| WO | 2012032189 A1 | 3/2012 |
| WO | 2014063838 A1 | 5/2014 |
| WO | 2017082693 A1 | 5/2017 |
| WO | 2021005141 A1 | 1/2021 |

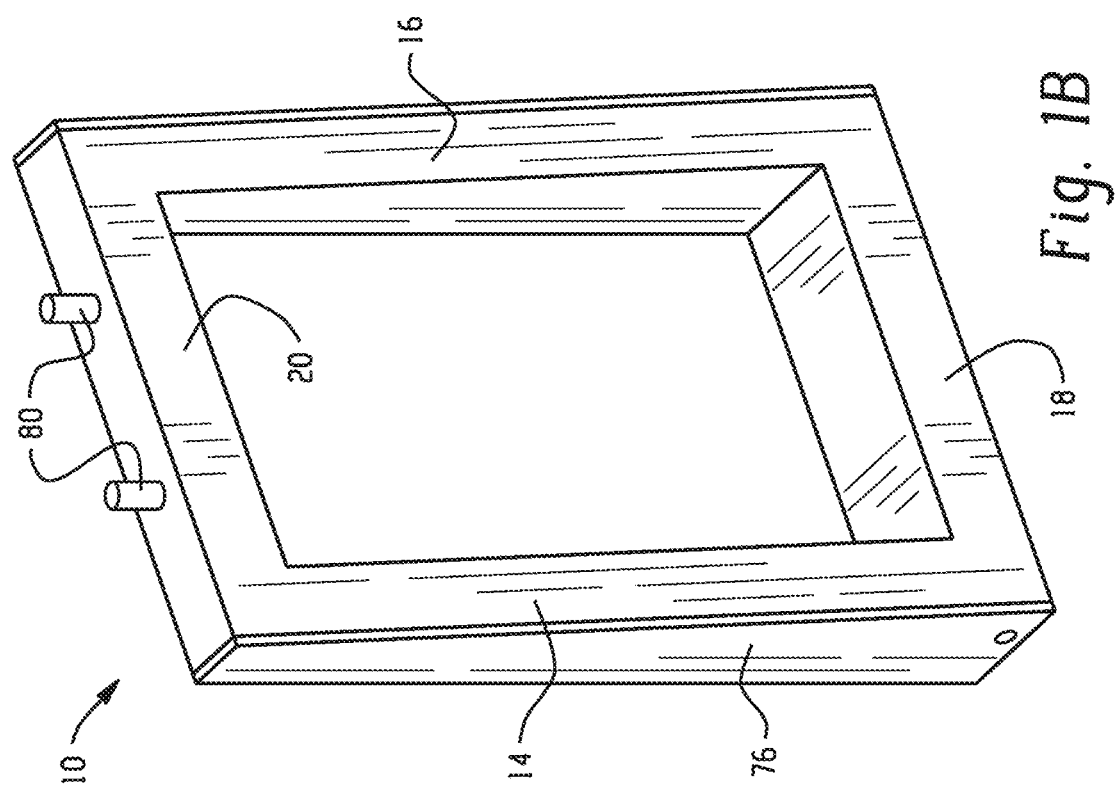
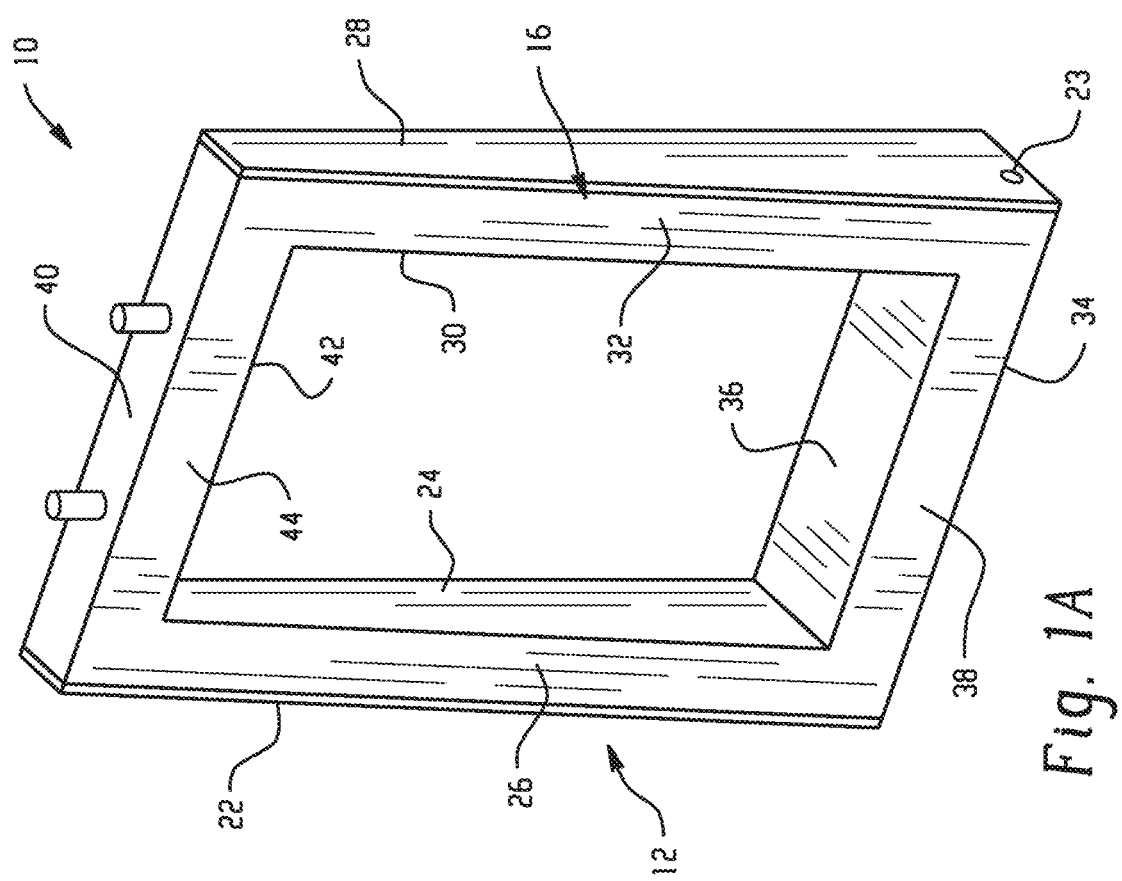
Fig. 1A
Fig. 1B

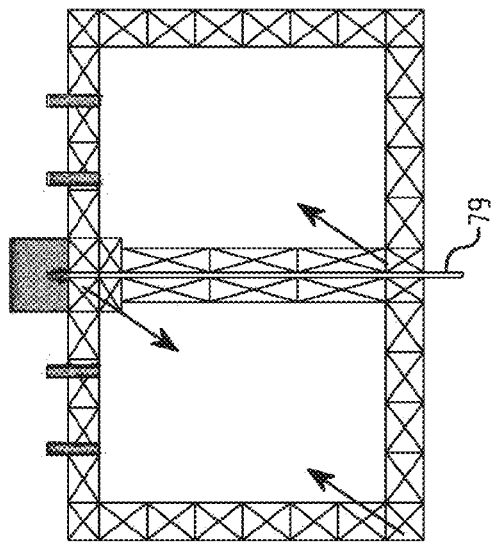
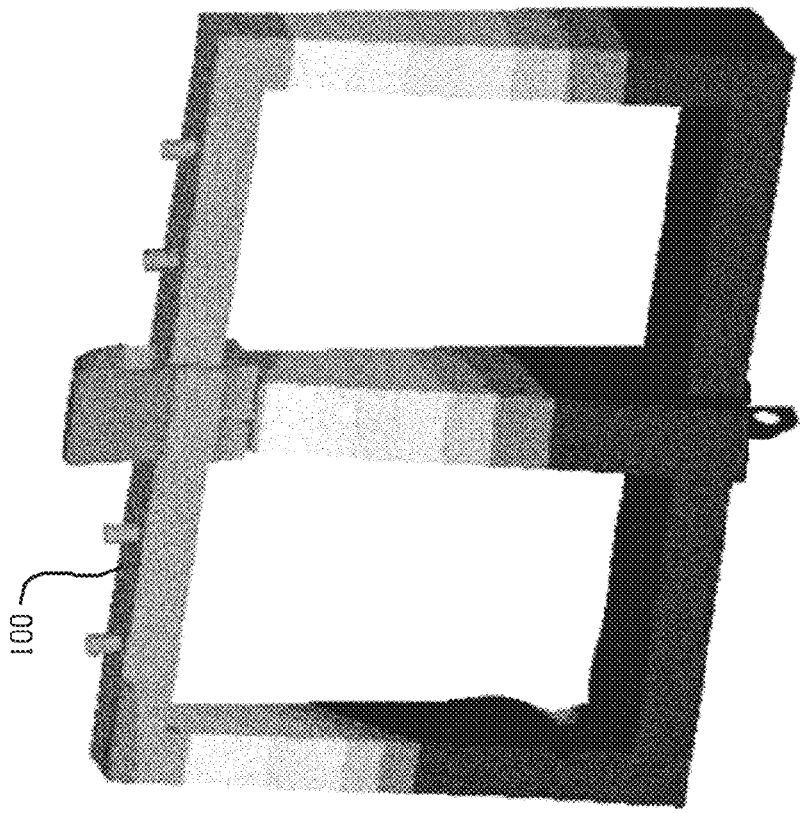
Fig. 6
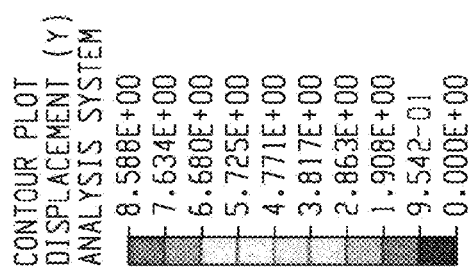

HYBRID SEAT STRUCTURE AND VEHICLE COMPRISING THE SAME

CROSS REFERENCE TO RELATED APPLICATIONS

This application is a continuation application of application Ser. No. 17/625,210, filed Jan. 6, 2022, which is a National Stage application of PCT/EP2020/069329, filed Jul. 9, 2020, which claims the benefit of European Application No. 19185749.9, filed Jul. 11, 2019, all of which are incorporated by reference in their entirety herein.

BACKGROUND

In the automotive industry, frames and backings for passenger seats are often made from multiple steel or aluminum components. These components are combined together from stamped, extruded, or otherwise formed sheets. This multi-component approach involves many different operations and pieces of equipment in order to form and combine all the separate components. For example, multiple components are welded or fastened together to form a single seat frame structure. The more components involved in the formation process, the more costly the process becomes. Such multi-component processes can often only be justified at large economies of scale, or in other words, when a high volume of seats are being produced. Lower volume production levels will often not justify the cost of such a multi-component process.

In addition, the overall weight of an automobile must be taken into consideration. For example, the inclusion of numerous metal components increases the mass of an automobile, thus negatively effecting fuel efficiency and performance. Automobiles must also maintain structural integrity and meet applicable safety standards so as to protect occupants in the event of a crash.

Accordingly, it would be desirable to provide an automobile seat that integrates multiple components into a single structure, reduces inclusion of metal components, improves manufacturing efficiency, reduces the overall mass of an automobile, and maintains structural integrity even in the event of an automobile accident.

SUMMARY

Disclosed, in various embodiments, are a hybrid seat structure and vehicle comprising the same.

A hybrid seating structure, comprising: a main structure formed from a thermoplastic material and injection molded as a single piece, comprising: a frame formed by a left channel, right channel, bottom channel, and top channel; wherein each channel is defined by an outside wall, an inside wall, and a connecting wall that extends between the outside wall and the inside wall, wherein the inside walls of each channel form an inner side of the frame, and the outside walls and connecting walls form an exterior side of the frame; and each channel comprises a first reinforcing rib structure disposed in the channel; a first reinforcement adjacent to and covering at least part of the outside wall of the left channel; and a second reinforcement adjacent to and covering at least part of the outside wall of the right channel.

A vehicle seat comprising the hybrid seating structure.

A vehicle comprising the vehicle seat or the hybrid seating structure.

These and other features and characteristics are more particularly described below.

BRIEF DESCRIPTION OF THE DRAWING

The following is a brief description of the drawing wherein like elements are numbered alike and which is presented for the purposes of illustrating the exemplary embodiments disclosed herein and not for the purposes of limiting the same.

FIGS. 1A and 1B are simplified diagrams representing a hybrid seat structure, tilted to the left and the right respectively, according to an embodiment;

FIG. 6 is a representation of deformation data from a crash simulation for a hybrid seat structure, not including a panel, according to an embodiment.

DETAILED DESCRIPTION

Figure 2:
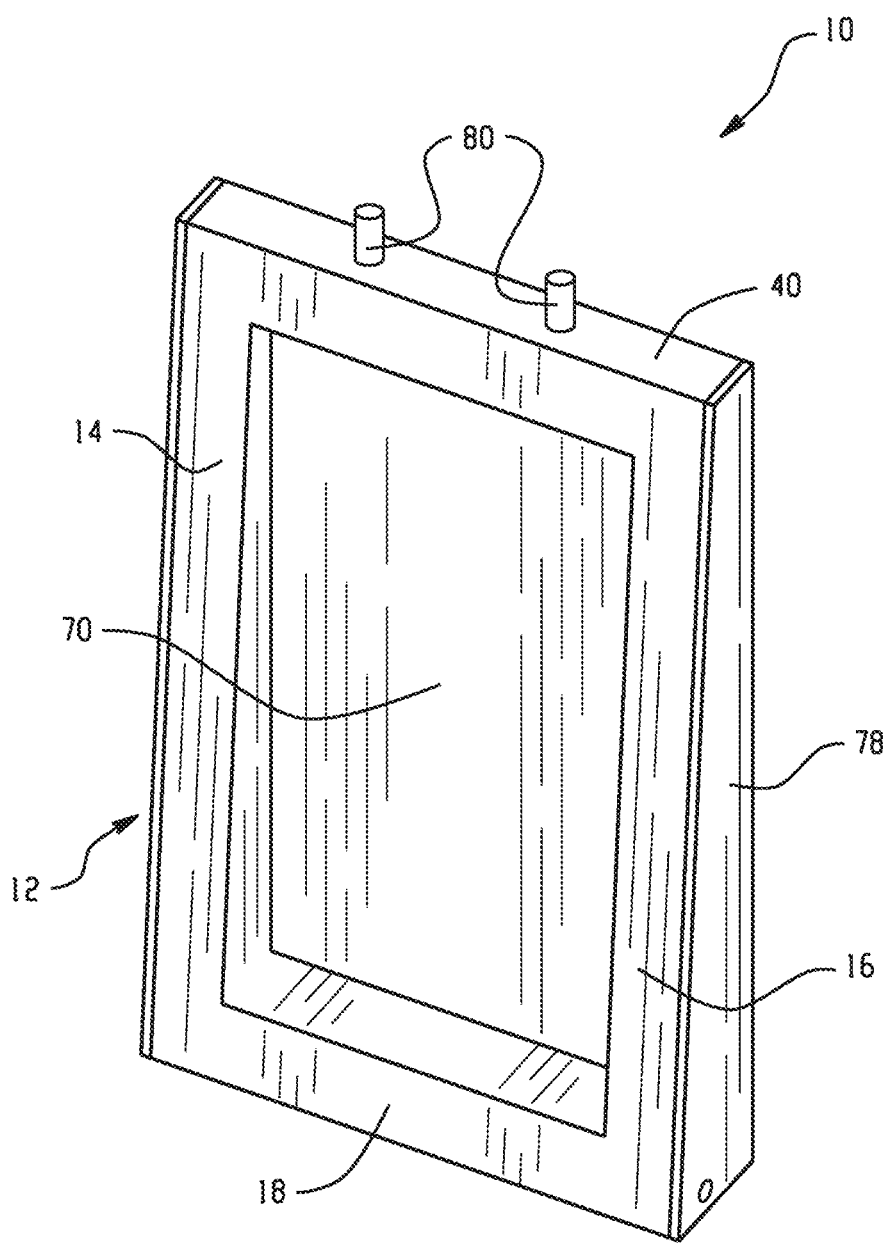
FIG. 2 is a simplified diagram representing a hybrid seat structure, including a panel, according to an embodiment.

The hybrid seat structure disclosed herein integrates multiple components into a single structure, reduces inclusion of metal components, improves manufacturing efficiency, reduces the overall mass of an automobile, and maintains structural integrity even in the event of an automobile accident.

A hybrid seating structure can comprise a main structure. For example, the main structure can be formed from a thermoplastic material and injection molded as a single piece. For example, the main structure can be free of metal. The main structure can comprise polyesters, polycarbonates, polystyrenes (e.g., copolymers of polycarbonate and styrene, polyphenylene ether-polystyrene blends), polyimides (e.g., polyetherimides), acrylonitrile-styrene-butadiene (ABS), polyarylates, polyalkylmethacrylates (e.g., polymethylmethacrylates (PMMA)), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidones, polycarboranes, polyoxabicyclononanes, polydibenzofurans, polyphthalamide, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazanes, polysiloxanes, fluoropolymers (e.g., polyvinyl fluoride (PVF), polyvinylidene fluoride (PVDF), polyvinyl fluoride (PVF), fluorinated ethylene-propylene (FEP), polyethylene tetrafluoroethylene (ETFE)), polycarbonate-siloxane block copolymer, terephthalate ester of resorcinol (ITR), N-phenylphenol phthaleinylbisphenol (PPP-BP), or a combination thereof. Preferably at least one polyolefin, such as polypropylene or polyethylene.

The thermoplastic material can further comprise fiber reinforcement, for example, the thermoplastic material can comprise at least one of glass, talc, or carbon. The reinforcement can be in the form of fibers. The fibers can be long fibers (e.g., 10 millimeters to 15 millimeters prior to molding, and at least 1 millimeter post molding), short fibers (e.g., 0.2 millimeters to 0.7 millimeters, or less than 1 mm pre- and post-molding length), continuous fibers, unidirectional fibers, or a combination thereof. The main structure can further comprise talc. Preferably, the main structure can comprise at least one thermoplastic material and a reinforcing material, wherein the thermoplastic material comprises at least one of polypropylene or polyethylene. The reinforcing material can comprise at least one of glass fibers or talc.

The main structure can comprise a frame formed by a left channel, right channel, bottom channel, and top channel. Each channel can be defined by an outside wall, an inside wall, and a connecting wall that extends between the outside wall and the inside wall. The inside walls of each channel can form an inner side of the frame, and the outside walls and connecting walls can form an exterior side of the frame. A shape of the frame formed by the channels can be polygonal, for example, rectangular.

The outside walls of the right and left channels can have a tapered shape, for example, with a wider first end adjacent to the outside wall of the bottom channel, and a narrower second end adjacent to the outside wall of the top channel. The width ratio between the first and second ends can be from 0.3 to 0.8, for example, 0.4 to 0.7, for example, 0.5 to 0.6. The outside walls can be defined by an insert that is molded into the main structure. For example, a reinforcement can be insert molded and/or overmolded with a second material. Such molding can define an outside wall of the main structure. Although illustrated structures herein show an outside wall that is planar, the present subject matter is not so limited, and can be formed any number of ways. In examples where a portion of the main structure is overmolded over a reinforcing structure, draft angles of channels of the main structure can be selected to allow for separation of an at least two part mold. The reinforcement can be metal or a chopped fiber composite thermoplastic or a laminate as defined herein. The reinforcement can be any number of structures, including bolster-shaped formed metal. The reinforcement can be formed of a vacuum formed thermoplastic with a composite exterior defining a lumen therein.

A headrest attachment structure can be insert molded and/or overmolded with a second material. The headrest attachment structure can be a simple metal tube that is insert molded and/or overmolded. However, the headrest attachment structure can be any shape intended to form a connecting member from a headrest, such as in a male/female relationship.

Figure 3:
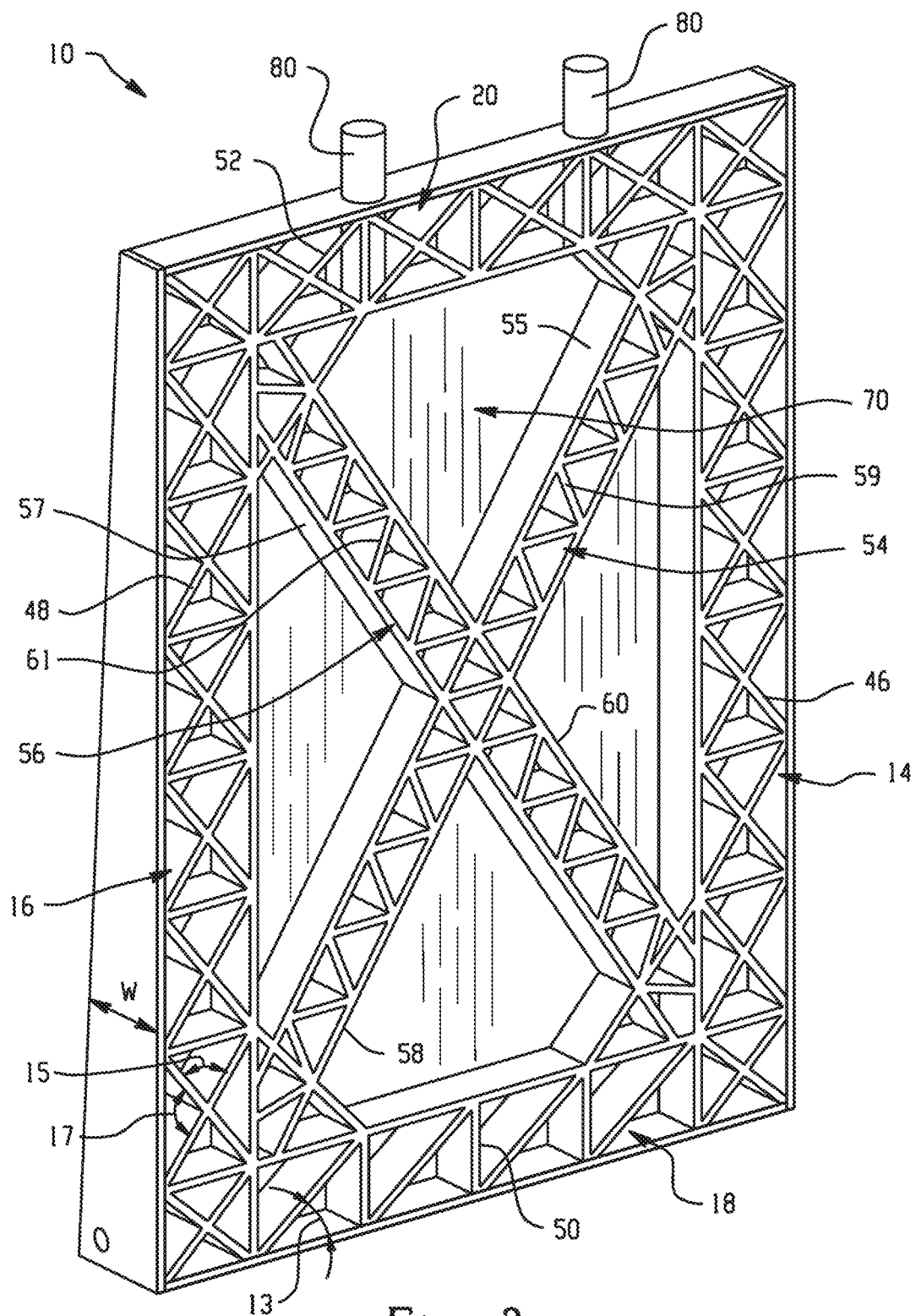
FIG. 3 is a rear-view simplified diagram representing a hybrid seat structure according to an embodiment.

Each channel (left, right, top, bottom) can comprise a first reinforcing rib structure disposed in the channel. For example, the first reinforcing rib structure can have a diagonal pattern, X-shaped pattern, honeycomb pattern, or a combination thereof. The term "pattern", can refer to a series of repeating geometric units. For example, the X-shaped pattern can comprise units of two intersecting ribs (in an "X" shape) located within a square or rectangular box shape (e.g., as seen in FIG. 3, right channel). The units then repeat adjacent to each other within the channel. The pattern of ribs can be the same for all four channels, or alternatively, two or more of the channels can comprise differing rib patterns. For example, the left, right, and top channels can comprise an X-shaped rib pattern, while the bottom channel can comprise a diagonal rib pattern (e.g., a single rib located within a square or rectangular box shape). The space in the channels not occupied by ribs can optionally be filled with foam for additional reinforcement.

The rib patterns can vary in rib density (i.e., number of ribs per unit area). For example, an increase in rib density and/or number of ribs can result in an increase in bending and/or torsional stiffness. For example, depending on the application, a more dense rib pattern can be used in a location of the structure where more stiffness is needed. Similarly, a less dense rib pattern can be used as needed for reduced stiffness and/or weight reduction of the structure.

Rib density can be varied in several ways. For example, a single-rib, non-intersecting pattern (e.g., the diagonal pattern depicted in FIG. 3, bottom channel) can comprise relatively fewer ribs and therefore be less dense. A multi-rib, intersecting pattern (e.g., like the X-shaped pattern depicted in FIG. 3, right channel) can comprise relatively more ribs and therefore be more dense.

Rib density can also depend upon a chosen number of repeating units in the rib pattern. For reference, the right channel as depicted in FIG. 3 comprises 8 repeating "X" shape units. If greater numbers of repeating units are included in the same channel, rib density increases. If fewer numbers of repeating units are included in the same channel, rib density decreases. For example, each channel can comprise 2 to 50 repeating rib pattern units, for example, 2 to 20 repeating rib pattern units, for example, 2 to 10 repeating rib pattern units.

Rib density can also depend upon a chosen rib angle. For example, referring to the diagonal pattern, an angle of intersection (e.g., angle 13 as shown in FIG. 3) formed between a rib and a wall of the channel can be 5 degrees to 85 degrees, for example, 15 degrees to 70 degrees, for example, 30 degrees to 55 degrees, for example, 40 degrees to 50 degrees. A larger angle of intersection can result in, for example, a denser pattern of ribs.

Referring to the X-shaped pattern, an angle of intersection formed between two ribs in the "X" shape can be 15 degrees to 165 degrees, for example, 30 degrees to 150 degrees, for example, 45 degrees to 135 degrees, for example, 60 degrees to 120 degrees, for example, 75 degrees to 105 degrees. The angle of intersection can be any of the four angles created by the intersection of the two ribs in the "X" shape (e.g., angle 15 or angle 17 as shown in FIG. 3). For example, angle (15) can be 15 degrees to 90 degrees, for example, 15 degrees to 60 degrees or 60 degrees to 90 degrees. The closer an angle of intersection is to 90 degrees, the more square-like the X-shaped pattern becomes (e.g., as depicted in FIG. 6, rightmost channel). The farther an angle of intersection is from 90 degrees, the more rectangular the X-shaped pattern becomes (e.g., as depicted in FIG. 6, center divider channel).

The outside wall of the left channel can comprise a first reinforcement. The outside wall of the right channel can comprise a second reinforcement. The first reinforcement and/or the second reinforcement can further comprise an opening, for example, an opening configured to mate with a body in white of a vehicle or an opening configured to mate with a seat belt. The first and/or second reinforcement may extend over at least part of the outside wall.

The first reinforcement and second reinforcement can comprise metal sheets, thermoplastic laminates reinforced with fibers as discussed above (e.g., in relation to the main structure), or a combination thereof. The metal sheets can have a thickness from 1.0 millimeter (mm) to 3.0 mm, for example, 1.5 mm to 2.5 mm, for example, 1.75 mm to 2.25 mm. Thermoplastic laminates can have a thickness from 1.5 mm to 5 mm, for example, 2.0 mm to 4.0 mm, for example, 2.5 mm to 3.5 mm. The fibers can be, for example, glass fibers, carbon fibers, or a combination thereof.

The hybrid seating structure can further comprise a headrest attachment structure. The headrest attachment structure may be connected to the main structure, for instance by attachment to the frame, such as extending through the outside wall of the top channel and through the reinforcing rib structure of the top channel. The headrest attachment structure can be configured to mate with a headrest component, for example, wherein the headrest attachment structure comprises at least two tubes or at least two rods. The hybrid seating structure can comprise a seatbelt component for connecting a seatbelt that in use extends across the hybrid seating structure.

The main structure can comprise a first cross structure extending diagonally between a corner where the top channel and the left channel meet, and a corner where the bottom channel and the right channel meet. The main structure can comprise a second cross structure extending diagonally between a corner where the top channel and the right channel meet, and a corner where the bottom channel and the left channel meet. Accordingly, the first and second cross structure together can form an X-shape between the inside walls of the frame. The corners where the cross structures extend from the main structure can optionally comprise additional supportive ribbing (e.g., as shown in the corners of the main structure in FIG. 3).

Each cross structure can comprise a channel formed of at least two adjacent walls. Each cross structure can comprises a second reinforcing rib structure disposed in the channel. The features and functionality described herein for the first reinforcing rib structure can also apply to the second reinforcing rib structure. For example, the second reinforcing rib structure can have a diagonal pattern, X-shaped pattern, honeycomb pattern, or a combination thereof. Depending on the application, the second reinforcing rib structure can match or differ from the first reinforcing rib structure. For example, the first reinforcing rib structure can be denser (i.e., stiffer) than the second reinforcement rib structure. Alternatively, the second reinforcing rib structure can be denser (i.e., stiffer) than the first reinforcing rib structure. A thickness of the walls of the channel can be from 1.3 mm to 3.5 mm, for example, 2.0 mm to 3.0 mm, for example, 2.25 mm to 2.75 mm. A ratio of a thickness of a cross structure to a thickness of a wall can be from 0.3 to 1.2, for example, 0.5 to 1.0, for example, 0.7 to 0.9.

The hybrid seating structure can comprise a panel extending between the inside walls of the channels (left, right, top, bottom). The panel can cover the first cross structure and the second cross structure. The panel can comprise thermoplastic material reinforced with fiber, metal sheets, (for example, steel or aluminum sheets), or a combination thereof. Examples of possible thermoplastic material and reinforcement are described above in relation to the main structure.

A thickness of the panel can be from 0.5 mm to 2.0 mm, for example, 1.0 mm to 1.5 mm, for example, 1.2 mm to 1.4 mm.

The main structure can comprise a divider channel having a first side wall, a second side wall, and a third connecting wall that extends between the first side wall and the second side wall. For example, the first side wall and the second side wall can perpendicular to the third connecting wall. The divider channel can be located between the left and right channels and extend between the top and bottom channels. When the divider channel is present, the main structure can comprise two X-shapes, formed from first and second cross structures (as described herein), and located adjacent to each other, on either side of the divider channel.

The divider channel can comprise a third reinforcement. For example, the third reinforcement can run through the center of the divider channel, for example, within the divider channel, hidden from view (e.g., see element 79 in FIG. 6). Two opposing ends of the third reinforcement (e.g., see each of two ends labeled with reference number 79 in FIG. 4) can extend from the divider channel and become visible. The two ends of the third reinforcement can comprise, for example, an opening configured to mate with a body in white of a vehicle or an opening configured to mate with a seatbelt. Similar to the first and second reinforcements, the third reinforcement can comprise metal, thermoplastic laminates reinforced with fibers, or a combination thereof, preferably a metal plate.

A vehicle seat can comprise the hybrid seating structure described herein.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Referring now to FIGS. 1-5, a hybrid seating structure (10, 100), comprises a main structure (12, 112) formed as a single piece. A frame is formed by a left channel (14), right channel (16), bottom channel (18), and top channel (20). Each channel (14, 16, 18, 20) is defined by an outside wall (22, 28, 34, 40), an inside wall (24, 30, 36, 42), and a connecting wall (26, 32, 38, 44) that extends between the outside wall and the inside wall, wherein the inside walls of each channel form an inner side of the frame, and the outside walls and connecting walls form an exterior side of the frame. Each channel (14, 16, 18, 20) comprises a first reinforcing rib structure (46, 48, 50, 52) disposed in the channel (FIG. 3); wherein the outside wall (22) of the left channel (14) comprises a first reinforcement (76); and wherein the outside wall (28) of the right channel (16) comprises a second reinforcement (78). The frame further comprises a headrest attachment structure (80) extending through the outside wall (40) of the top channel and through the reinforcing rib structure (52) of the top channel. The first reinforcement (76), the second reinforcement (78), and the third reinforcement (79), comprise an opening (23) configured to mate with a body in white of a vehicle.

The reinforcement (76, 78) can be formed of a first material different than the one or more of the connecting walls (26, 32, 38, 44). The channel (14, 16) can be insert molded and/or overmolded over the first reinforcement. The outside wall (28, 22) can be defined by exposed first material. The first material can be formed of steel or composite such as a laminate as disclosed herein. The channel (14, 16) can be formed from a filled polypropylene, such as a polypropylene filled with chopped glass fiber, such as STAMAX.

The headrest attachment structure (80) can be formed of different material than the one or more of the connecting walls (26, 32, 38, 44). The top channel (20) can be insert molded and/or overmolded over the headrest attachment structure. The headrest attachment structure (80 can be formed from steel. The top channel (20) can be formed from a filled polypropylene, such as a polypropylene filled with chopped glass fiber, such as STAMAX.

The present compositions can be included in laminae, also referred to as plies. Such a lamina can—but need not—include fibers. If included, the fibers can comprise fibers having one or more of the present compositions (e.g., made by passing the composition(s)—either melted or dissolved in a solvent—through a spinneret), carbon fibers, glass fibers, aramid fibers, ceramic fibers, basalt fibers, and/or the like. In some such laminae, the fibers can be dispersed within a matrix material comprising, for example, one or more of the present compositions, a thermoplastic material, and/or a thermoset material.

The fibers in such a lamina can be arranged in any suitable fashion. To illustrate, the fibers can be aligned in a single direction; for example, the lamina can be unidirectional (e.g., a unidirectional tape). To further illustrate, the fibers can be arranged in a woven configuration, such as in a plane, twill, satin, basket, leno, mock leno, or the like weave. To yet further illustrate, the lamina can be non-woven (e.g., dry-laid, wet-laid, spunmelt, or the like), in which the fibers are multi-directional, arranged in a sheet or web, and connected to one another via entanglement and/or thermal and/or chemical bonds rather than in a weave or knit. As stated, some laminae comprising one or more of the present compositions may not include fibers; for example, such a lamina can comprise a sheet or film of those composition(s). Laminates, which can include any two or more of the laminae described above arranged in any suitable layup (e.g., asymmetric or symmetric), are also disclosed.

The present compositions can also be included in skin-core (e.g., sandwich, ABA, and the like) composites, in which relatively—when compared to the core—thin and stiff skin(s) are disposed on one or both sides of a relatively—when compared to the skin(s)—thick and low-density core. By way of example, the core can include foam (e.g., open- or closed-cell), a honeycomb structure, balsa wood, and/or the like, and the skin(s) can include fiber-reinforced laminate(s). Such a skin-core composite can comprise one or more of the present compositions in that its skin(s) can include one or more of any of the laminae and laminates described above and/or its core can comprise one or more of the present compositions.

Also disclosed are molding materials that include one or more of the present compositions, which may be suitable for use in, for example, injection molding and/or compression molding. Such a molding material can be provided as pellets. The disclosed molding materials can include a filler, such as talc, calcium carbonate, discontinuous or short fibers (e.g., including any of the fiber-types described above), and/or the like.

The present compositions can be included in articles. To illustrate, such an article can comprise one or more of any of the laminae, laminates, and skin-core composites described above and/or any of the molding materials described above. In such an article including one or more laminae, laminates, and/or skin-core composites, the lamina (e), laminate(s), and/or skin-core composite(s) can be bonded to a molding material via overmolding, compression molding, and/or the like.

Referring now to FIG. 3, the hybrid seat structure (10) comprises a first cross structure (54) extending diagonally within the frame between a corner where the top channel (20) and the left channel (14) meet, and a corner where the bottom channel (18) and the right channel (16) meet. The main structure (12, 112) further comprises a second cross structure (56) extending diagonally within the frame between a corner where the top channel (20) and the right channel (16) meet, and a corner where the bottom channel (18) and the left channel (14) meet. The first and second cross structure together form an X-shape between the inside walls (24, 30, 36, 42) of the frame (FIG. 3). Each cross structure (54, 56) comprises a channel formed of at least two adjacent walls (55, 57, 58, 60), and wherein each cross structure (54, 56) further comprises a second reinforcing rib structure (59, 61) disposed in the channel.

The hybrid seating structure (10) can further comprise a panel (70) extending between the inside walls (24, 30, 36, 42) of the channels (14, 16, 18, 20) (FIG. 2). The panel (70) covers the first cross structure (54) and the second cross structure (56). The panel (70) has a first surface and an opposite second surface, wherein the first surfaces faces in the direction of the connection walls, i.e. the front of the seat, and the second surface in an opposite direction, i.e. to the back of the seat. Preferably, the panel covers the cross structure such that the second surface faces the cross structure, for instance in an adjacent location, i.e. the second surface of the panel is adjacent to the cross structure. The cross structure (54, 56) may be not or less visible when looking towards the connecting walls of the frame channels when the panel (70) covers the cross structure (54, 56). The panel (70) may extend between the inside walls of the channels, thus extend within the inner side of the frame. A shape of the frame formed by the channels (14, 16, 18, 20) is rectangular. The outside walls (28, 22) of the right and left channels have a tapered shape, with a wider first end adjacent to the outside wall (34) of the bottom channel, and a narrower second end adjacent to the outside wall (40) of the top channel, wherein the width (W) ratio between the first and second ends is from 0.3 to 0.8 (FIG. 3).

The panel (70) can be formed of a first material different than the one or more of the connecting walls (26, 32, 38, 44). The channel (14, 16) can be insert molded and/or overmolded over the panel. One or more of the back or front major surface of the panel (70) can be defined by exposed first material that has not been overmolded by other members of the hybrid seat structure (10). The first material can be formed of steel or composite such as a laminate as disclosed herein. The other members of the hybrid seat structure (10) can be formed from a filled polypropylene, such as a polypropylene filled with chopped glass fiber, such as STAMAX.

Figure 4:
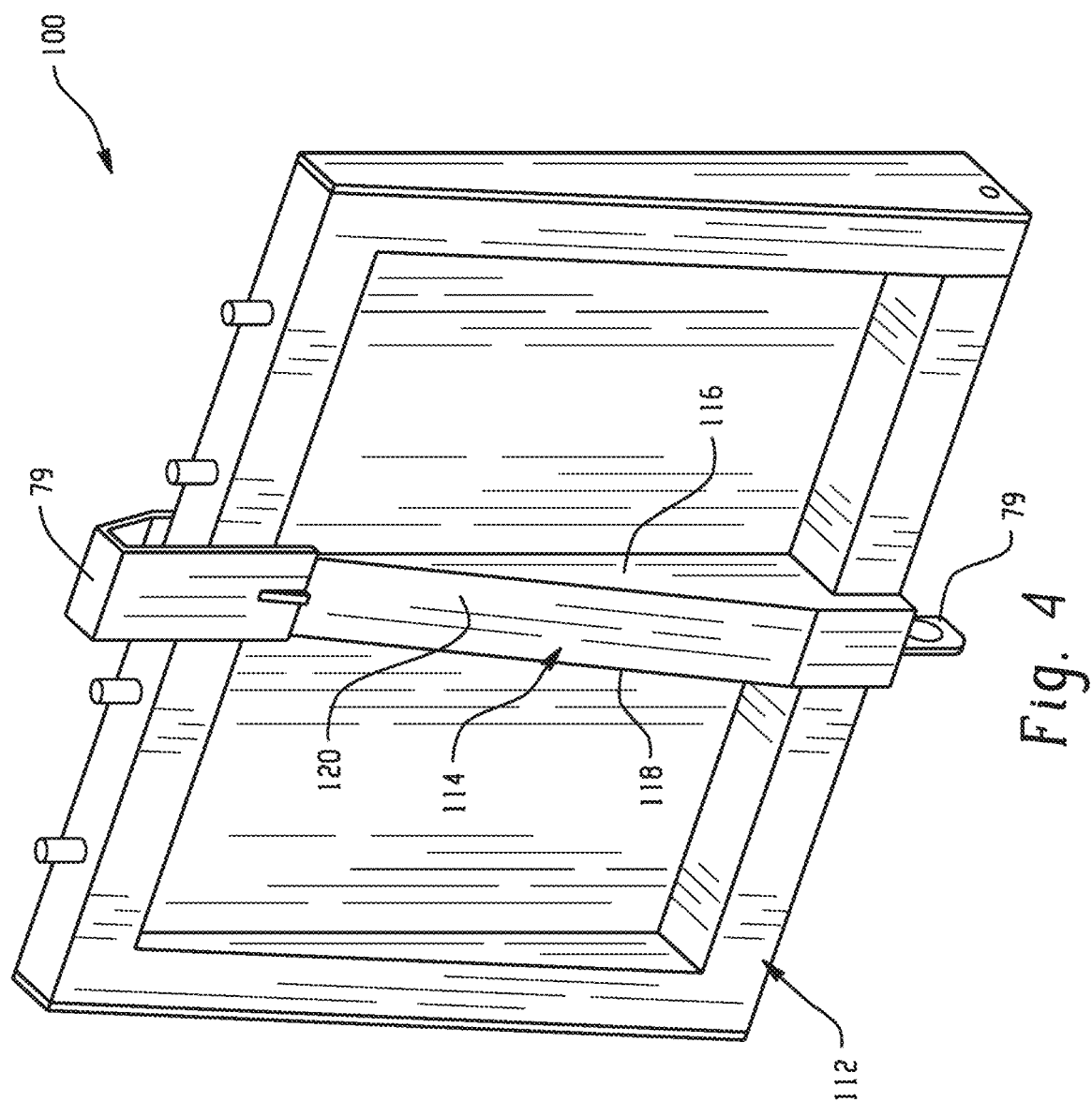
FIG. 4 is a simplified diagram representing a hybrid seat structure, including a divider channel, according to an embodiment.
Figure 5:
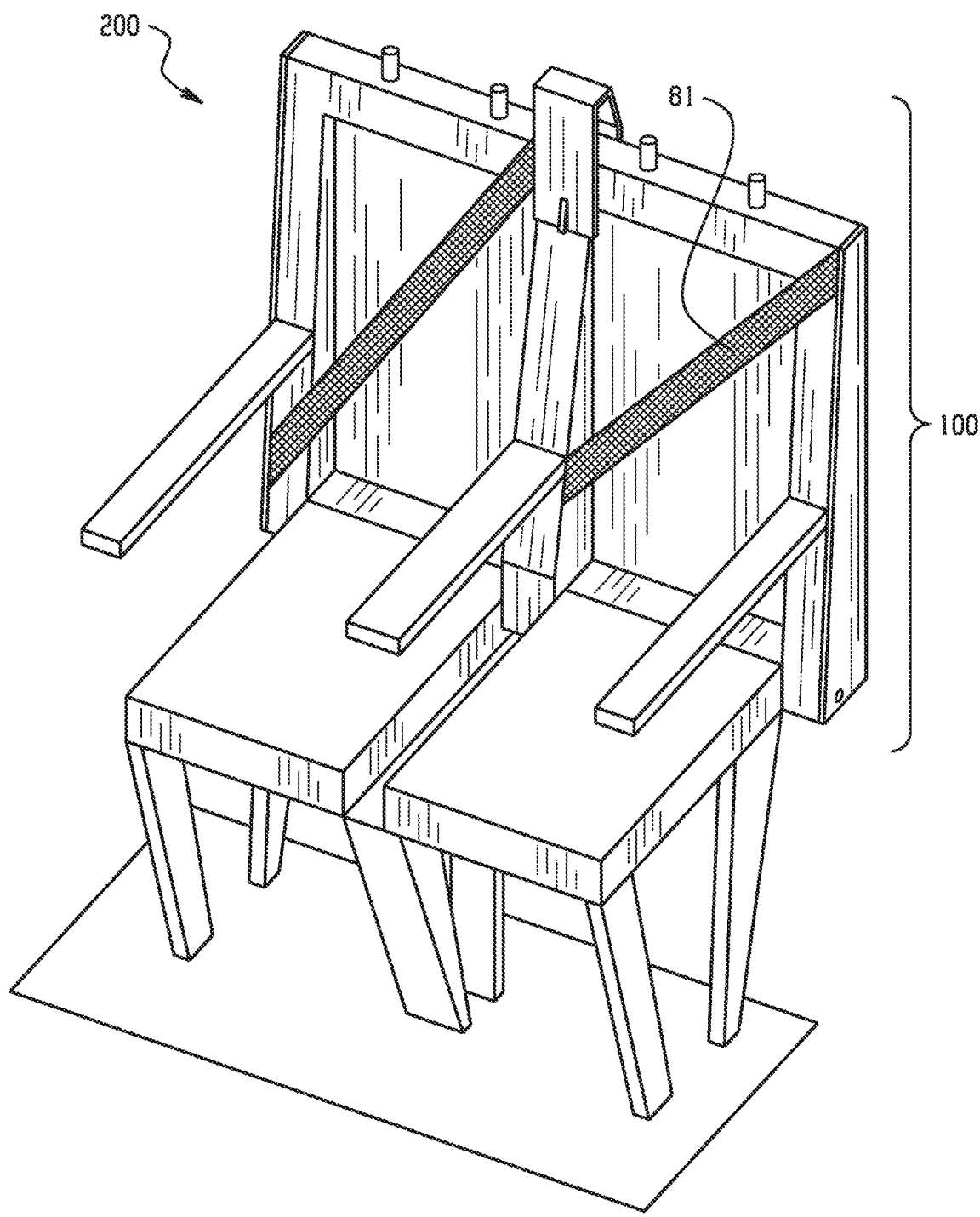
FIG. 5 is a simplified diagram representing a vehicle seat comprising a hybrid seat structure according to an embodiment.

Referring now to FIG. 4, the main structure (12, 112) further comprises a divider channel (114). The divider channel (114) can divide the main structure into two sections, for example, two adjacent passenger seating sections in the rear of an automobile (e.g., as depicted in FIG. 5). The divider channel (114) can have a first side wall (116), a second side wall (118), and a third connecting wall (120) that extends between the first side wall (116) and the second side wall (118), wherein the divider channel is located between the left and right channels (14, 16) and extends between the top (20) and bottom (18) channels. The first side wall (116) and the second side wall (118) are perpendicular to the third connecting wall. As shown in FIG. 6, the ribbing located in the divider channel (114) is more rectangular and less dense than the ribbing located in the rest of the main structure. The divider channel (114) comprises a third reinforcement (79). The third reinforcement (79) can run through the center of the divider channel, i.e., within the divider channel, hidden from view (e.g., see element 79 in FIG. 6). Two opposing ends of the third reinforcement (e.g., see each of two ends labeled with reference number 79 in FIG. 4) can extend from the divider channel (114) and become visible.

Figure 8:
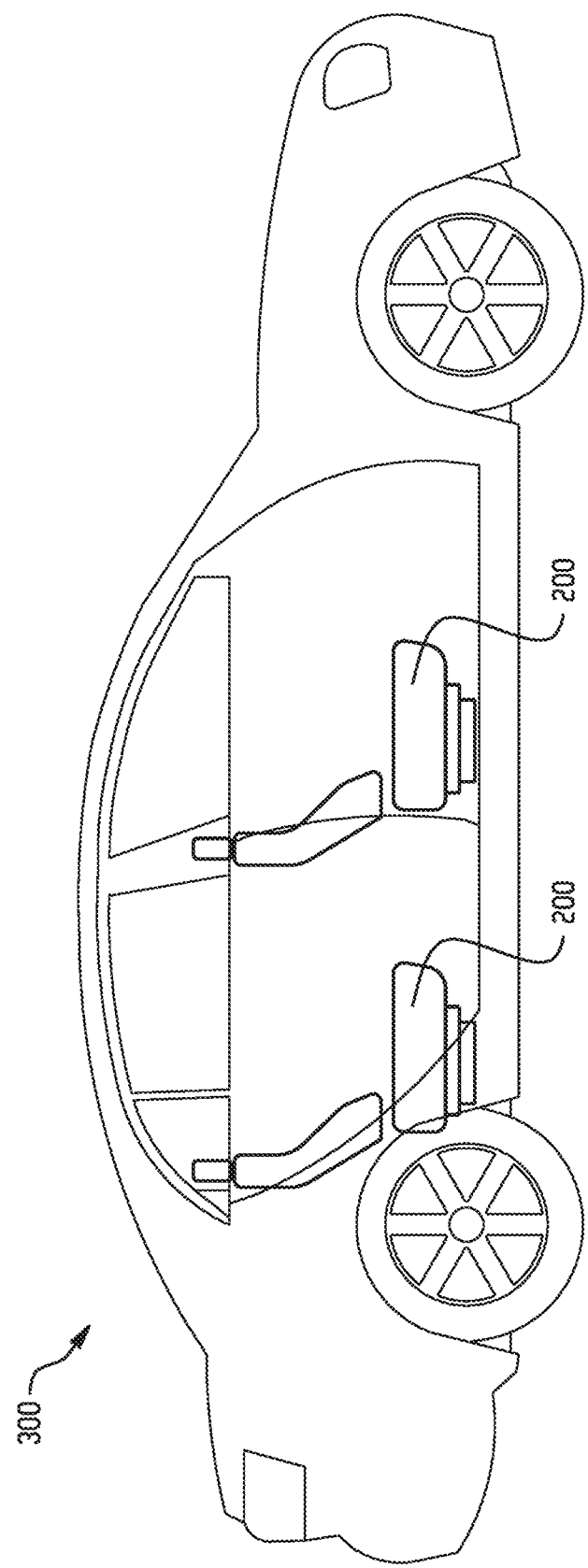
FIG. 8 is a simplified diagram representing a vehicle comprising a hybrid seat structure according to an embodiment.

Referring now to FIG. 5, a vehicle seat (200) comprises a hybrid seating structure (10, 100). A seatbelt component (81) extends across the hybrid seating structure (10,100). FIG. 8 illustrates the vehicle seat (200) comprises a hybrid seating structure (10, 100) in a vehicle (300).

The following examples are merely illustrative of the hybrid seat structure disclosed herein and are not intended to limit the scope hereof.

EXAMPLES

Example 1

Deformation patterns and stiffness for the hybrid structures (100), comprising a single formed piece of thermoplastic as disclosed herein, are tested. Experimental trials are conducted using computer-aided engineering (CAE) simulation software, more specifically, a contour plot displacement analysis system in LS-DYNA (a general-purpose finite element program capable of simulating complex real world problems).

Figure 7:
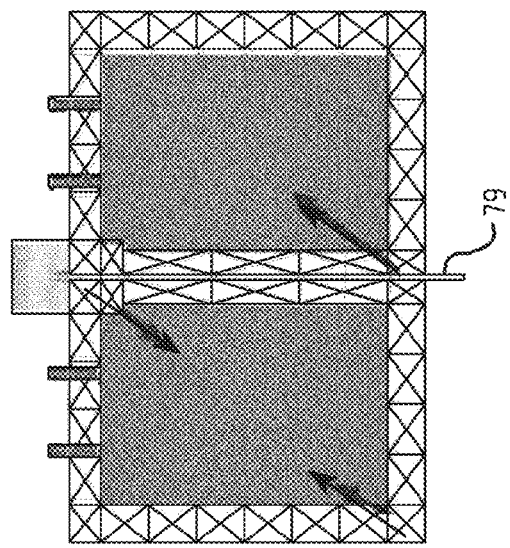
FIG. 7 is a representation of deformation data from a crash simulation for a hybrid seat structure, including a panel, according to an embodiment.
Figure 7:
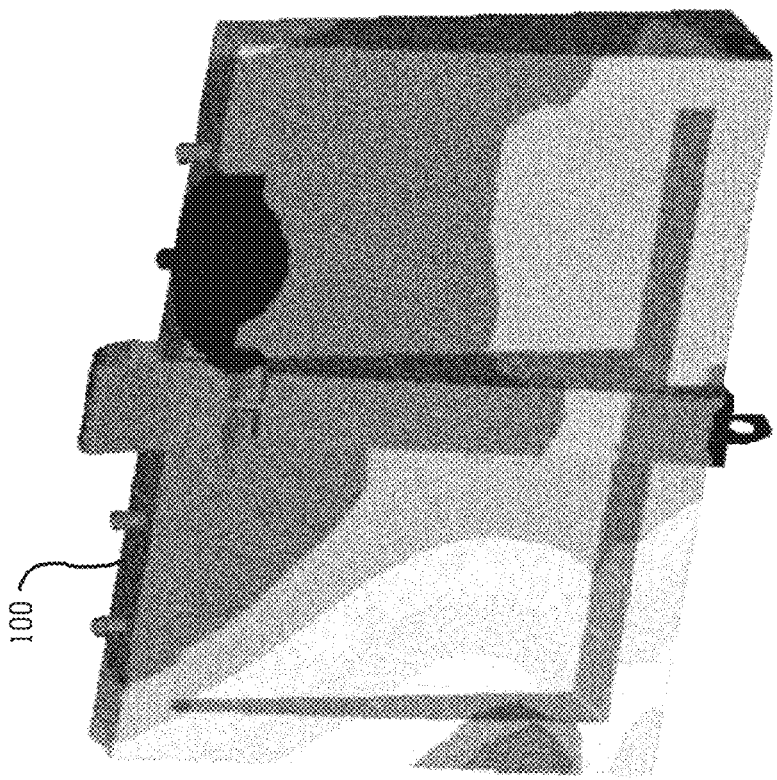
Figure 7:
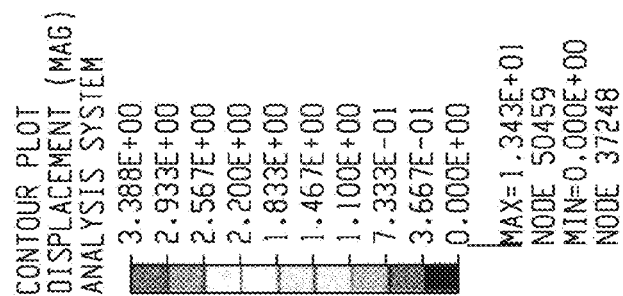

The arrows shown in FIGS. 6 and 7 represent three directional load forces. The forces are intended to represent forces experienced by a seat during an impact. In other words, the force applied to seatbelts during an automobile accident. In order to comply with safety standards (e.g., the ECE-14 safety belt pull test), testing is performed with each force being 13.5 kilonewtons (kN). The vehicle seat structures must resist such forces and maintain structural integrity during an accident.

In the first trial, a hybrid seat structure (100), without a panel (70), is tested. The data from this trial is shown in FIG. 6. The hybrid seat structure (100) is formed from polypropylene reinforced with 30% long glass fibers (commercially available as STAMAX™) The structure further comprises medium strength steel sheet reinforcements, 1.5 millimeters in thickness. As seen in FIG. 6, an X-shaped reinforcement rib pattern is used. The outer perimeter channels of the structure comprise a greater number of repeating X-shaped units than the center divider channel. The angles of intersection formed between two ribs in the "X" shapes of the outer perimeter channels are closer to 90 degrees compared to the angles of intersection in the center divider channel. This increases the stiffness of the outer perimeter as compared to the center divider. The hybrid seat structure (100) weighs 4.3 kilograms.

The maximum deformation of the hybrid seat structure (100) during the simulated accident is 11 millimeters. Maximum deformation refers to the distance that the hybrid seat structure is deformed from its original state, in the direction of the load forces. The thermoplastic material of the hybrid seat structure (100) also remains in an elastic zone. This demonstrates that the hybrid seat structure (100) disclosed herein maintains structural integrity, even without a panel, in the event of an automobile accident.

For further comparison, the maximum deformation of an all metal seat structure (a tubular assembly of eight pieces of medium strength steel, 5 kilograms total weight), for example, as found in light commercial vehicles such as a cargo van, under simulated accident forces as described above, is 31 millimeters. This demonstrates that the hybrid seat structure (100) disclosed herein can achieve a significantly improved stiffness over an all metal design seat structure while also reducing the total weight of the structure.

In the second trial, a hybrid seat structure (100) as used in the first trial, with a panel (70), is tested. The panel (70) is formed from polypropylene reinforced with 30% long glass fibers (commercially available as STAMAX™). The data from this trial is shown in FIG. 7. As shown, the second trial demonstrates a significant improvement in the uniformity of stress distribution as compared to the first trial. In other words, the simulated accident in the second trial does not cause as many points of concentrated stress in the tested structure. Similar to the second trial, deformation levels remain very low. The maximum deformation of the hybrid seat structure (100), with a panel (70), during the simulated accident is 5.2 millimeters. This demonstrates that the hybrid seat structure (100) disclosed herein maintains structural integrity even in the event of an automobile accident.

As demonstrated, the hybrid seat structure disclosed herein integrates multiple components into a single structure, reduces inclusion of metal components, improves manufacturing efficiency, reduces the overall mass of an automobile, and maintains structural integrity even in the event of an automobile accident.

The hybrid seat structure insert disclosed herein includes at least the following aspects.

Aspect 1: A hybrid seating structure (10, 100), comprising: a main structure (12, 112) formed from a thermoplastic material and injection molded as a single piece, comprising: a frame formed by a left channel (14), right channel (16), bottom channel (18), and top channel (20); wherein each channel (14, 16, 18, 20) is defined by an outside wall (22, 28, 34, 40), an inside wall (24, 30, 36, 42), and a connecting wall (26, 32, 38, 44) that extends between the outside wall and the inside wall, wherein the inside walls of each channel form an inner side of the frame, and the outside walls and connecting walls form an exterior side of the frame; wherein each channel (14, 16, 18, 20) comprises a first reinforcing rib structure (46, 48, 50, 52) disposed in the channel; wherein the outside wall (22) of the left channel (14) comprises a first reinforcement (76); and wherein the outside wall (28) of the right channel (16) comprises a second reinforcement (78).

Aspect 2: The hybrid seating structure according to Aspect 1, wherein the main structure (12, 112) further comprises, a first cross structure (54) extending diagonally within the frame between a corner where the top channel (20) and the left channel (14) meet, and a corner where the bottom channel (18) and the right channel (16) meet; and a second cross structure (56)

extending diagonally within the frame between a corner where the top channel (20) and the right channel (16) meet, and a corner where the bottom channel (18) and the left channel (14) meet, the first and second cross structure together forming an X-shape between the inside walls (24, 30, 36, 42) of the frame.

Aspect 3: The hybrid seating structure according to Aspect 2, wherein each cross structure (54, 56) comprises a channel formed of at least two adjacent walls (55, 57, 58, 60), and wherein each cross structure (54, 56) further comprises a second reinforcing rib structure (59, 61) disposed in the channel.

Aspect 4: The hybrid seating structure according to any of the preceding aspects, further comprising a panel (70) extending between the inside walls (24, 30, 36, 42) of the channels (14, 16, 18, 20).

Aspect 5: The hybrid seating structure according to Aspect 4, wherein the panel (70) covers the first cross structure (54) and the second cross structure (56), wherein the panel (70) comprises thermoplastic material reinforced with chopped fiber, metal sheets, thermoplastic laminate reinforced with continuous fiber, or a combination thereof, and wherein a thickness of the panel (70) is from 0.5 mm to 2.0 mm.

Aspect 6: The hybrid seating structure according to any of the preceding aspects, wherein the first reinforcement (76) and second reinforcement (78) comprise metal sheets having a thickness from 1.00 mm to 3.00 mm, or thermoplastic laminates reinforced with continuous glass fibers or continuous carbon fiber, and having a thickness from 1.5 mm to 5 mm.

Aspect 7: The hybrid seating structure according to any of the preceding aspects, wherein a shape of the frame formed by the channels (14, 16, 18, 20) is polygonal, preferably rectangular.

Aspect 8: The hybrid seating structure according to any of the preceding aspects, wherein the outside walls (28, 22) of the right and left channels have a tapered shape, with a wider first end adjacent to the outside wall (34) of the bottom channel, and a narrower second end adjacent to the outside wall (40) of the top channel, preferably wherein the width (W) ratio between the first and second ends is from 0.3 to 0.8.

Aspect 9: The hybrid seating structure according to any of the preceding aspects, wherein the main structure further comprises a divider channel (114) having a first side wall (116), a second side wall (118), and a third connecting wall (120) that extends between the first side wall (116) and the second side wall (118), wherein the divider channel is located between the left and right channels (14, 16) and extends between the top (20) and bottom (18) channels, wherein the first side wall (116) and the second side wall (118) are perpendicular to the third connecting wall, preferably wherein the divider channel (114) comprises a third reinforcement (79) running through the center of and extending from the divider channel (114).

Aspect 10: The hybrid seating structure according to any of the preceding aspects, further comprising a seatbelt component (81) extending across the hybrid seating structure (10, 100).

Aspect 11: The hybrid seating structure according to any of the preceding aspects, wherein the first reinforcing rib structure (46, 48, 50, 52), the second reinforcing rib structure, or a combination thereof, has a diagonal pattern, X-shaped pattern, honeycomb pattern, or a combination thereof.

Aspect 12: The hybrid seating structure according to any of the preceding aspects, wherein the first reinforcement (76), the second reinforcement (78), third reinforcement (79), or a combination thereof, comprise an opening (23) configured to mate with a body in white of a vehicle or an opening (23) configured to mate with a seat belt.

Aspect 13: The hybrid seating structure according to any of the preceding aspects, wherein the main structure (12, 112) is free of metal.

Aspect 14: The hybrid seating structure according to any of the preceding aspects, further comprising a headrest attachment structure (80).

Aspect 15: The hybrid seating structure of Aspect 14, wherein the headrest attachment structure extends through the outside wall (40) of the top channel and through the reinforcing rib structure (52) of the top channel.

Aspect 16: The hybrid seating structure of any of the preceding aspects, wherein the thermoplastic material of the main structure comprises at least one of polypropylene or polyethylene, and wherein the main structure can further comprise a reinforcing material comprising at least one of glass and talc.

Aspect 17: The hybrid seating structure of any of the preceding aspects, wherein the first reinforcing rib structure (46, 48, 50, 52) comprises a diagonal rib pattern, wherein an angle (13) of intersection formed between a rib and a wall of the channel is 5 degrees to 85 degrees, preferably, 15 degrees to 70 degrees, preferably, 30 degrees to 55 degrees, preferably, 40 degrees to 50 degrees.

Aspect 18: The hybrid seating structure of any of the preceding aspects, wherein the first reinforcing rib structure (46, 48, 50, 52) comprises an X-shaped pattern, wherein an angle (15, 17) of intersection formed between two ribs in the "X" shape is 15 degrees to 165 degrees, preferably, 30 degrees to 150 degrees, preferably, 45 degrees to 135 degrees, preferably, 60 degrees to 120 degrees, preferably, 75 degrees to 105 degrees.

Aspect 19: A vehicle seat (200) comprising a hybrid seating structure (10, 100) of any of the preceding aspects.

Aspect 20: A vehicle comprising a vehicle seat (200) of Aspect 19, or a hybrid seating structure (10, 100) according to any of Aspects 1-18.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." Reference throughout the specification to "an embodiment" means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference. If this application claims priority to a prior application, the prior application is incorporated herein in its entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A hybrid seating structure (10, 100), comprising:
   a main structure (12, 112) formed from a thermoplastic material and injection molded as a single piece, comprising:
   a frame formed by a left channel (14), right channel (16), bottom channel (18), and top channel (20);
   wherein each channel (14, 16, 18, 20) is defined by an outside wall (22, 28, 34, 40), an inside wall (24, 30, 36, 42), and a connecting wall (26, 32, 38, 44) that extends between the outside wall and the inside wall, wherein the inside walls of each channel form an inner side of the frame, and the outside walls and connecting walls form an exterior side of the frame; and
   wherein the main structure further comprises a divider channel (114) having a first side wall (116), a second side wall (118), and a third connecting wall (120) that extends between the first side wall (116) and the second side wall (118), wherein the divider channel is located between the left and right channels (14, 16) and extends between the top (20) and bottom (18) channels, wherein the first side wall (116) and the second side wall (118) are perpendicular to the third connecting wall, and
   wherein the divider channel (114) divides the main structure into two seating sections.

2. The hybrid seating structure according to claim 1, wherein the main structure (12, 112) further comprises,
   a first cross structure (54) extending diagonally within the frame between a corner where the top channel (20) and the left channel (14) meet, and a corner where the bottom channel (18) and the right channel (16) meet; and
   a second cross structure (56) extending diagonally within the frame between a corner where the top channel (20) and the right channel (16) meet, and a corner where the bottom channel (18) and the left channel (14) meet,
   the first and second cross structure together forming an X-shape between the inside walls (24, 30, 36, 42) of the frame.

3. The hybrid seating structure according to claim 2, wherein each channel (14, 16, 18, 20) comprises a first reinforcing rib structure (46, 48, 50, 52) disposed in the channel.

4. The hybrid seating structure according to claim 3, wherein each cross structure (54, 56) comprises a channel formed of at least two adjacent walls (55, 57, 58, 60), and
   wherein each cross structure (54, 56) further comprises a second reinforcing rib structure (59, 61) disposed in the channel.

5. The hybrid seating structure according to claim 4, wherein:
   hybrid seating structure further comprises a panel (70) extending between the inside walls (24, 30, 36, 42) of the channels (14, 16, 18, 20),
   the panel (70) covers the first cross structure (54) and the second cross structure (56),
   the panel (70) comprises thermoplastic material reinforced with chopped fiber, metal sheets, thermoplastic laminate reinforced with continuous fiber, or a combination thereof, and
   a thickness of the panel (70) is from 0.5 mm to 2.0 mm.

6. The hybrid seating structure according to claim 4, wherein the first reinforcing rib structure (46, 48, 50, 52), the second reinforcing rib structure, or a combination thereof, has a diagonal pattern, X-shaped pattern, honeycomb pattern, or a combination thereof.

7. The hybrid seating structure according to claim 1, wherein:
   the outside walls (22, 28) of the right and left channels (14, 16) have
   a wider first end adjacent to the outside wall (34) of the bottom channel (18), and
   a narrower second end adjacent to the outside wall (40) of the top channel (20); and
   a width (W) ratio between the first and second ends is from 0.3 to 0.8.

8. The hybrid seating structure according to claim 1, wherein the main structure (12, 112) is free of metal.

9. A vehicle seat (200) comprising a hybrid seating structure (10, 100) according to claim 1.

10. A vehicle comprising a vehicle seat (200) of claim 9.

11. A hybrid seating structure (10, 100), comprising:
    a main structure (12, 112) formed from a thermoplastic material and injection molded as a single piece, comprising:
    a frame formed by a left channel (14), right channel (16), bottom channel (18), and top channel (20);
    wherein each channel (14, 16, 18, 20) is defined by an outside wall (22, 28, 34, 40), an inside wall (24, 30, 36, 42), and a connecting wall (26, 32, 38, 44) that extends between the outside wall and the inside wall, wherein the inside walls of each channel form an inner side of the frame, and the outside walls and connecting walls form an exterior side of the frame; and a panel (70) extending between the inside walls (24, 30, 36, 42) of the channels (14, 16, 18, 20);

wherein the main structure further comprises a divider channel (114) having a first side wall (116), a second side wall (118), and a third connecting wall (120) that extends between the first side wall (116) and the second side wall (118), wherein the divider channel is located between the left and right channels (14, 16) and extends between the top (20) and bottom (18) channels, wherein the first side wall (116) and the second side wall (118) are perpendicular to the third connecting wall, and wherein the divider channel (114) divides the main structure into two seating sections.

12. The hybrid seating structure according to claim 11, wherein each channel (14, 16, 18, 20) comprises a reinforcing rib structure (46, 48, 50, 52) disposed in the channel.

13. The hybrid seating structure according to claim 11, wherein the outside walls (28, 22) of the right and left channels have a tapered shape, with a wider first end adjacent to the outside wall (34) of the bottom channel, and a narrower second end adjacent to the outside wall (40) of the top channel.

14. A vehicle seat (200) comprising a hybrid seating structure (10, 100) according to claim 11.

15. A vehicle comprising a vehicle seat (200) of claim 14.

16. A hybrid seating structure (10, 100), comprising:

a main structure (12, 112) formed from a thermoplastic material and injection molded as a single piece, comprising:

a frame formed by a left channel (14), right channel (16), bottom channel (18), and top channel (20);

wherein each channel (14, 16, 18, 20) is defined by an outside wall (22, 28, 34, 40), an inside wall (24, 30, 36, 42), and a connecting wall (26, 32, 38, 44) that extends between the outside wall and the inside wall, wherein the inside walls of each channel form an inner side of the frame, and the outside walls and connecting walls form an exterior side of the frame; and a divider channel (114) having a first side wall (116), a second side wall (118), and a third connecting wall (120) that extends between the first side wall (116) and the second side wall (118), wherein the divider channel is located between the left and right channels (14, 16) and extends between the top (20) and bottom (18) channels, wherein the first side wall (116) and the second side wall (118) are perpendicular to the third connecting wall, wherein the divider channel (114) comprises a reinforcement (79) running through the center of and extending from the divider channel (114), wherein the outside walls (28, 22) of the right and left channels have a tapered shape, with a wider first end adjacent to the outside wall (34) of the bottom channel, and a narrower second end adjacent to the outside wall (40) of the top channel.

17. The hybrid seating structure according to claim 16, wherein each channel (14, 16, 18, 20) comprises a reinforcing rib structure (46, 48, 50, 52) disposed in the channel.

18. The hybrid seating structure according to claim 17, wherein the reinforcing rib structure (46, 48, 50, 52) has a diagonal pattern, X-shaped pattern, honeycomb pattern, or a combination thereof.

19. A vehicle seat (200) comprising a hybrid seating structure (10, 100) according to claim 16.

20. A vehicle comprising a vehicle seat (200) of claim 19.

\* \* \* \* \*